3,321,426
WAX PRODUCTS AND METHOD OF MAKING THE SAME
William Smith Dorsey, Fullerton, Calif., assignor to Union Oil Company of California, Los Angeles, Calif., a corporation of California
No Drawing. Filed June 18, 1962, Ser. No. 203,019
17 Claims. (Cl. 260—28.5)

This invention relates to novel wax products, and in particular concerns wax-containing compositions in the form of discrete free-flowing particles or pellets which are resistant to agglomeration upon storage atmospheric temperatures. It further concerns a method for making such compositions.

Petroleum and vegetable waxes, and compositions comprising relatively large amounts of the same, are widely used in the various arts as coatings, impregnants, adhesives, etc. Usually they are applied in molten or dissolved form, and considerable inconvenience is caused by the fact that they are packaged and marketed in the form of slabs or the like which do not lend themselves to being readily melted or dissolved. Considerable time and money would be saved if such composition could be made available in the form of relatively small particles or pellets having a high surface-to-volume ratio. However, while the compositions in question can be prepared in such form by comminution, atomizing, etc., they have such low softening points (130° F.) that particles thereof quickly coalesce or agglomerate and revert to a solid mass at atmospheric temperatures.

It is accordingly an object of the present invention to provide a wax or wax composition in the form of relatively small particles which resist agglomeration and reversion to a solid mass during storage at atmospheric temperatures. A further object is to provide a simple and economical method for making such compositions in such form. Other objects will be apparent from the following description of the invention.

I have now found that the above objects and attendant advantages can be realized by agitating the wax or wax composition in the molten state within a body of a non-solvent liquid which contains a finely-divided solid but which is free of any agent capable of forming stable colloidal dispersions or emulsions of the wax or wax composition in the non-solvent liquid. The agitation breaks up the molten material into a multiplicity of molten particles or droplets and simultaneously effects a substantially uniform distribution of the finely-divided solid over the surface of the same, whereby subsequent coalescence of the molten particles is prevented. The body of liquid and the molten particles contained therein is then allowed to cool to a temperature below the melting point of the wax or wax composition, whereby the molten particles of the same solidify to form a mass of discrete solid particles bearing a surface coating of the finely-divided solid. Since the treatment has been carried out in the absence of any agent capable of colloidally dispersing the particles in the liquid, the coated particles readily separate from the liquid as a particulate solid phase which can readily be filtered from the liquid and dried to form the desired free-flowing non-agglomerating particulate solid.

I am aware that in the preparation of wax emulsions, finely-divided inert solids are frequently employed as loading or flatting agents or for the purpose of adjusting the pH of the emulsion. However, in preparing such compositions the primary object is to produce a stable emulsion or colloidal dispersion, and to achieve this object it is necessary to provide one or more emulsifying or dispersing agents which emulsify or disperse both the wax and the inert solids. In the process of the present invention, however, in order that the wax particles may be separated from the non-solvent liquid it is essential that emulsification or stable dispersion of the same be avoided. Emulsification or stable dispersion of the inert solids must likewise be avoided in order to permit the same to be deposited on the surface of the wax particles. For these reasons, an essential and distinguishing feature of the process of the invention lies in the fact that the treatment is carried out in the substantial absence of any agent capable of promoting the formation of stable emulsions or colloidal dispersions of either the wax or the inert solids.

Considering now the invention in somewhat greater detail, it is adapted to the processing of any normally solid wax or wax-containing composition of such nature that particles of the same display a strong tendency to agglomerate and revert to a solid mass at atmospheric temperatures, e.g., at temperatures of about 20° F. to about 120° F. In addition to the paraffin and microcrystalline petroleum waxes, mineral waxes such as montan wax, and vegetable waxes such as carnauba and candelilla wax, as well as blends of the same, there may also be employed blends of any of these waxes with synthetic resins such as polyethylene, polypropylene, polybutene, polyisoprene, polyisobutene, copolymers of ethylene and vinyl acetate, copolymers of ethylene and ethyl acrylate, polyvinylchloride, etc. Usually the weight ratio of wax and synthetic resin in such blends varies from about 199/1 to about 1/6. The wax and wax compositions employed in practice of the invention may also contain minor amounts of such conventional modifiers as dyes, pigments, plasticizing agents, etc., provided that none of such materials has substantial emulsifying or dispersing properties.

The non-solvent liquid within which the wax or wax composition is agitated in accordance with the invention may be any liquid in which the wax or wax composition is neither appreciably miscible in the molten state nor appreciably soluble in the solid state. Preferably, such liquid has a normal boiling point substantially above the melting point of the wax or wax composition, but lower boiling liquids may be employed provided the operation is carried out under superatmospheric pressure. Water is of course preferred, but non-solvent organic liquids such as glycol, highly halogenated hydrocarbons, etc., may be employed if desired, particularly when the material is a wax-resin blend. The volume of non-solvent liquid employed should be at least equal to that of the molten wax or wax composition, and is preferably considerably greater, e.g., from 5 to 25 times as great.

The finely-divided solid can be any material which is insoluble in both the non-solvent liquid and the wax or wax composition and does not promote the formation of emulsions or colloidal dispersions. Oxides and hydroxides of the metals of Groups II, III, IVA, V, VI, VII and VIII of the Periodic Table, e.g., calcium oxide, calcium hydroxide, magnesium hydroxide, aluminum oxide, strontium hydroxide, ferric hydroxide, zinc oxide, cobalt oxide, vanadium oxide, titanium dioxide, chromium hydroxide, etc., form a preferred class, but salts of such metals, e.g., barium sulfate, lead sulfate, calcium carbonate, ferric carbonate, chromium sulfide, etc., may likewise be employed. Synthetic resins such as polystyrene, polyethylene, polyvinyl acetate, cellulose acetate, etc., having the requisite solubility characteristics are also suitable. The particle size of the solid material is suitably 100 mesh or smaller, e.g., from about 100 to 300 mesh. The amount in which the solid is employed can be varied between relatively wide limits, e.g., from about 2 to about 50 percent of the weight of the wax or wax composition, with the optimum amount being between about 10 and about 30 percent depending upon the particle size of the solid, the nature of the wax or wax composition, and the nature of the non-solvent liquid.

Procedure-wise, the operation can be carried out in a number of different ways. According to one mode of operation, the non-solvent liquid is heated to a temperature above the melting point of the wax or wax composition, and the latter is melted and introduced into the body of liquid and stirred or otherwise subjected to strong agitation until it is broken up into small droplets. The size of the latter is largely dependent upon the speed of stirring, the temperature, the viscosity of the non-solvent liquid, and the particular equipment employed. Without interrupting the stirring the finely-divided solid is added, and stirring is continued for several minutes until the appearance of the droplets indicates that the molten droplets have become coated with the solid. The mixture is then allowed to cool, whereupon the coated droplets solidify to form a mass of individual solid particles. The mass is separated from the body of liquid, and traces of the latter are removed by air drying, centrifuging, or the like. According to an alternative mode of operation, the finely-divided solid is introduced into the body of non-solvent liquid prior to the addition of the molten wax or wax composition. Also, if desired, the wax or wax composition may be introduced into the non-solvent liquid in solid form, and the mixture then heated to effect melting of the wax, after which it is stirred and the solid is added as above described. In large-scale operation it is preferred to provide the necessary agitation by means of a colloid mill or homogenizer, or by rapidly circulating the materials through a suitably heated vessel by means of a high-speed gear pump or the like.

The following examples illustrate a number of ways in which the process of the invention has been carried out but are not to be construed as limiting the invention.

EXAMPLE I

A 500 ml. volume of tap water is heated to boiling, whereupon 100 grams of molten petroleum wax are added with stirring over a period of about one minute. The wax is a highly refined microcrystalline paraffin wax having an ASTM Congealing Point of 163° F., and is at a temperature of about 200° F. when added to the boiling water. Stirring is effected by means of a high speed (1750 r.p.m.) motor-driven perforated disc impeller. Upon completion of the wax addition, 10 grams of finely-divided calcium oxide (less than 100 mesh) is gradually added to the water with stirring, after which stirring is continued for about one minute. The mixture is then transferred to another vessel and is allowed to cool to room temperature. At this point the wax floats on the surface of the water as a fragile cake composed of tiny spheroids coated with calmium hydroxide, the latter having been formed by reaction between the calcium oxide and the water. The cake is removed and broken up, and is air-dried to obtain the wax product as a white free-flowing coarse powder which does not revert to block form upon storage at room temperature.

EXAMPLE II

Using the same technique, Example I is repeated using 30 grams of calcium sulfate, calcium carbonate, barium sulfate and magnesium hydroxide as the finely-divided solid. In each case the wax product is obtained as a white free-flowing mass of powder or pellets much more resistant to agglomeration upon storage at room temperature than the untreated wax.

EXAMPLE III

Example I is repeated except that the finely-divided solid (30 grams) is stirred into the boiling water prior to stirring in the molten wax. After addition of the wax, stirring is continued for about one minute before transferring the mixture to the second vessel for cooling. By employing various solids, the following products are obtained:

Strontium hydroxide _____ White, free-flowing powder.
Ferric hydroxide _____ Reddish-brown pellets.
Ferrous hydroxide _____ Greenish-grey pellets.
Zinc hydroxide _____ White, free-flowing powder.
Manganese hydroxide _____ Light tan pellets.
Cupric hydroxide _____ Dark brown pellets.
Lead sulfate _____ White pellets.

EXAMPLE IV

Two liters of tap water are circulated through a steam heated colloid mill (Eppenbach, Model QV6 set for coarsest dispersion) until a temperature of 170° F. is obtained. During the heating 20 grams of calcium oxide are gradually added to the circulating water stream. 400 grams of molten wax (same as in Example I) at a temperature of 225° F. are then added to the circulating stream, after which the mill is operated for an additional one minute. The mixture is discharged from the mill and allowed to cool to room temperature, after which the solidified wax particles are separated from the water and are broken up and air-dried. The wax product is a white free-flowing fine powder with improved resistance to blocking. A very similar product is obtained by treating a mixture of 70 weight percent of 132° F. melting point microcrystalline petroleum wax and 30 weight percent of a 28:72 copolymer of vinyl acetate and ethylene.

EXAMPLE V

Using the procedure of Example I, 75 grams of a wax composition consisting of 55 weight percent of the wax employed in Example I, and 45 weight percent of an ethylene-vinyl acetate copolymer ("Elvax 240") is treated with 350 grams of water and 50 grams of calcium sulfate. The product takes the form of white free-flowing tiny pellets. An ash determination indicates the product to contain about 0.9 weight percent of the calcium sulfate coating. Similar results are obtained by substituting 25 grams of calcium carbonate for the calcium sulfate. Comparable products are obtained by substituting carnauba wax, montan wax, and esparto wax for the wax-polymer blend.

Other modes of applying the principle of my invention may be employed instead of those explained, change being made as regards the materials or methods employed, provided the steps or the product stated by the following claims or the equivalent of such stated steps or product be employed or obtained.

I, therefore, particularly point out and distinctly claim as my invention:

1. The process for treating a material selected from the class consisting of wax and mixtures of wax and synthetic resins, said material being meltable and of such nature that particles thereof normally adhere to each other and agglomerate upon storage at atmospheric temperatures, which process comprises subjecting said material in the molten state to agitation while contained in a body of a non-solvent liquid maintained at a temperature above the melting point of said material and containing a finely-divided solid which is insoluble in said liquid and in said material, said agitation being effected in the substantal absence of any agent capable of colloidally dispersing said material and said solid in said liquid, whereby said material becomes subdivided into discrete particles having said solid substantially uniformly distributed on the surface thereof; cooling said liquid and said particles to a temperature below the melting point of said material; and separating the solidified material from said liquid as solid particles having said finely-divided solid substantially uniformly distributed over the surface thereof and having improved resistance to agglomeration at atmospheric temperature.

2. A process as defined in claim 1, wherein said non-solvent liquid is water.

3. A process as defined in claim 1, wherein said finely-divided solid is selected from the class consisting of the oxides, hydroxides, and carbonates of the metals of Groups II, III, IVA, V, VI, VII and VIII of the Periodic System.

4. A process as defined in claim 1, wherein said material is a petroleum wax.

5. A process as defined in claim 1, wherein said material is a mixture of a petroleum wax and a synthetic resin.

6. A process as defined in claim 1, wherein said material is a mixture of a petroleum wax and a copolymer of ethylene and vinyl acetate.

7. The process for treating a material selected from the class consisting of wax and mixtures of wax and synthetic resins, said material being meltable and of such nature that particles thereof normally adhere to each other and agglomerate upon storage at atmospheric temperatures, which process comprises subjecting said material in the molten state to agitation while contained in a body of water maintained at a temperature above the melting point of said material and containing a finely-divided water-insoluble inorganic solid, said agitation being effected in the substantial absence of any agent capable of colloidally dispersing said material and said solid in water, whereby said material becomes subdivided into discrete particles having said solid substantially uniformly distributed on the surface thereof; cooling said liquid and said particles to a temperature below the melting point of said material; and separating the solidified material from the water as solid particles having said finely-divided solid substantially uniformly distributed over the surface thereof and having improved resistance to agglomeration at atmospheric temperature.

8. A process as defined in claim 7 wherein said material is a petroleum wax.

9. A process as defined in claim 7 wherein said material is a mixture of a petroleum wax and a synthetic resin.

10. A process as defined in claim 7 wherein said material is a mixture of a petroleum wax and a copolymer of ethylene and vinyl acetate.

11. A process as defined in claim 7 wherein said solid is selected from the class consisting of water-insoluble oxides, hydroxides, and carbonates of a metal of Groups II, III, IVA, V, VI, VII and VIII of the Periodic System.

12. A process as defined in claim 7 wherein said solid is calcium hydroxide.

13. A process as defined in claim 7 wherein said solid is calcium carbonate.

14. A particulate composition comprising particles of a meltable material selected from the class consisting of wax and mixtures of wax and synthetic resins having a finely-divided inorganic solid substantially uniformly distributed over the surface thereof; said material tending to coalesce and revert to a solid mass upon storage at atmospheric temperatures, said inorganic solid constituting between about 10 and about 30 percent by weight of the entire composition, and said composition being substantially free-flowing and resistant to coalescence at atmospheric temperature.

15. A composition as defined in claim 14, wherein said material is a petroleum wax.

16. A composition as defined in claim 14, wherein said material is a mixture of a petroleum wax and a copolymer of ethylene and vinyl acetate.

17. A composition as defined in claim 14, wherein said solid is selected from the class consisting of the oxides, hydroxides, and carbonates of a metal of Groups II, III, IVA, V, VI, VII, and VIII of the Periodic System.

References Cited by the Examiner

UNITED STATES PATENTS

| | | | |
|---|---|---|---|
| 2,969,340 | 1/1961 | Kaufman et al. | 260—28.5 |
| 3,048,553 | 8/1962 | Moss | 260—28.5 |

OTHER REFERENCES

Warth, The Chemistry and Technology of Waxes, Reinhold Publishing Corporation, New York, page 377 TP 670 W25 1956 C.2.

MORRIS LIEBMAN, *Primary Examiner.*

D. C. KOLASCH, B. A. AMERNICK,
*Assistant Examiners.*